United States Patent
Yamaguchi et al.

(10) Patent No.: US 11,930,309 B2
(45) Date of Patent: Mar. 12, 2024

(54) OPTICAL AND ELECTRONIC INTEGRATED SWITCH

(71) Applicant: Nippon Telegraph and Telephone Corporation, Tokyo (JP)

(72) Inventors: Keita Yamaguchi, Musashino (JP); Osamu Moriwaki, Musashino (JP); Shunichi Soma, Musashino (JP); Kenya Suzuki, Musashino (JP); Seiki Kuwabara, Musashino (JP); Tetsuro Inui, Musashino (JP); Shuto Yamamoto, Musashino (JP); Seiji Okamoto, Musashino (JP); Hideki Nishizawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 30 days.

(21) Appl. No.: 17/801,446

(22) PCT Filed: Feb. 26, 2020

(86) PCT No.: PCT/JP2020/007844
§ 371 (c)(1),
(2) Date: Aug. 22, 2022

(87) PCT Pub. No.: WO2021/171438
PCT Pub. Date: Sep. 2, 2021

(65) Prior Publication Data
US 2023/0060777 A1    Mar. 2, 2023

(51) Int. Cl.
*H04Q 11/00* (2006.01)

(52) U.S. Cl.
CPC . *H04Q 11/0005* (2013.01); *H04Q 2011/0052* (2013.01)

(58) Field of Classification Search
None
See application file for complete search history.

(56) References Cited

U.S. PATENT DOCUMENTS 6,708,000 B1 * 3/2004 Nishi ............... H04J 14/0227
                                                       398/1
9,756,407 B2 * 9/2017 Kakande ............... H04L 49/65
(Continued)

FOREIGN PATENT DOCUMENTS

EP           2541969 A1 *  1/2013  ......... H04Q 11/0005
JP        2012248925 A  * 12/2012
(Continued)

OTHER PUBLICATIONS

The Consortium for On-Board Optics, *Consortium for On-Board Optics The Use of On-Board Optic Compliant Modules in Coherent Applications*, COBO Coherent Application Note, Mar. 2019, http://onboardoptics.org/wp-content/uploads/2019/05/COBO-CohOBO-AppNote-March-2018.pdf, pp. 1-39.
(Continued)

*Primary Examiner* — Jai M Lee
(74) *Attorney, Agent, or Firm* — Workman Nydegger (57) ABSTRACT

A photonics-electronics convergence switch with which, even if an optical network system is built by combining a plurality of packet switches, the amount of processing in the packet switches does not increase, the optical network system operates with low electric power consumption, and this enables wide-range optical communication between the nodes of a communication origin and of a communication partner, includes a network processor that is an electronic circuit configured to control the functions of the packet switch, a plurality of optical transmitter-receivers having photoelectric conversion functions, and a plurality of optical switches. Different types of optical switches cooperate to select a path through which inputted optical signals or optical signals inputted from a different packet switch connected to the packet switch are outputted to a different packet switch without passing through the processor and a path through which inputted optical signals or optical signals
(Continued)

inputted from a different packet switch pass through the processor and are subjected to photoelectric conversion.

11 Claims, 5 Drawing Sheets

(56) References Cited

U.S. PATENT DOCUMENTS

| | | | | |
|---|---|---|---|---|
| 10,911,846 | B2* | 2/2021 | Kucharewski | H04Q 11/0005 |
| 10,917,707 | B2* | 2/2021 | Testa | H04Q 11/0062 |
| 11,089,392 | B2* | 8/2021 | Rickman | H04Q 11/0005 |
| 11,728,893 | B1* | 8/2023 | Sluyski | H04L 47/20 |
| | | | | 398/135 |
| 2015/0188657 | A1* | 7/2015 | Chiaroni | H04J 14/0212 |
| | | | | 398/48 |
| 2023/0073384 | A1* | 3/2023 | Moriwaki | H04Q 11/0071 |

FOREIGN PATENT DOCUMENTS

| | | |
|---|---|---|
| JP | 5681394 B2 | 3/2015 |
| JP | 2012-248952 A | 12/2022 |

OTHER PUBLICATIONS

The Consortium for On-Board Optics, *Optical Connectivity Options for 400 Gbps and Higher On-Board Optics*, A COBO White paper, Revision1.0, Mar. 2019, http://onboardoptics.org/wp-content/uploads/2019/03/COBO-Optical-Connectivity-Whitepaper-March-2019.pdf, pp. 1-41.

Ken-ichi Sato et al., *GMPLS-Based Photonic Multilayer Router(Hikari Router) Architecture: An Overview of Traffic Engineering and Signaling Technology*, IEEE Communications Magazine, vol. 40, 2002, pp. 96-101.

* cited by examiner

OPTICAL AND ELECTRONIC INTEGRATED SWITCH

TECHNICAL FIELD

The present invention relates to a high-performance photonics-electronics convergence switch belonging to network switches.

BACKGROUND ART

Nowadays, electronic-circuit-based packet switches are often used for network switches used for the Internet. An example of an electronic circuit that controls this packet switch is a network processor, the capacity of which tends to increase year by year. The capacity of this network processor is determined by the value obtained by multiplying the signal speed by the number of ports. However, the increase in the capacity of the network processor increases the number of signals inputted to and outputted from the network processor, requiring an increase of the number of wiring lines (which may be called electrical wiring) through which electrical signals used for the input and output pass or an increase of the signal speed.

The higher the signal speed of the signals propagating through electrical wiring, the shorter the propagable distance of the signals, while the density of electrical wiring cannot be increased beyond the physical upper limit. For this reason, a further increase in the capacity of the network processor makes it difficult even to propagate electrical signals to the distance within the board or so. Under these circumstances, it is being studied to convert electrical signals into optical signals within the propagable distance and use optical wiring which is capable of long-distance transmission compared to electrical signals. Note that techniques related to the above description are disclosed in non-patent literature 1 and non-patent literature 2.

Techniques embodying the above study points are also being proposed. For example, non-patent literature 1 discloses an optical transmitter-receiver used for such applications that electronic circuits such as a network processor and optical transmitter-receivers having photoelectric conversion functions are provided side by side on a substrate and that these electronic circuits and optical transmitter-receivers are connected to one another with metal wiring or the like formed of an electrical conductor.

Figure 1:
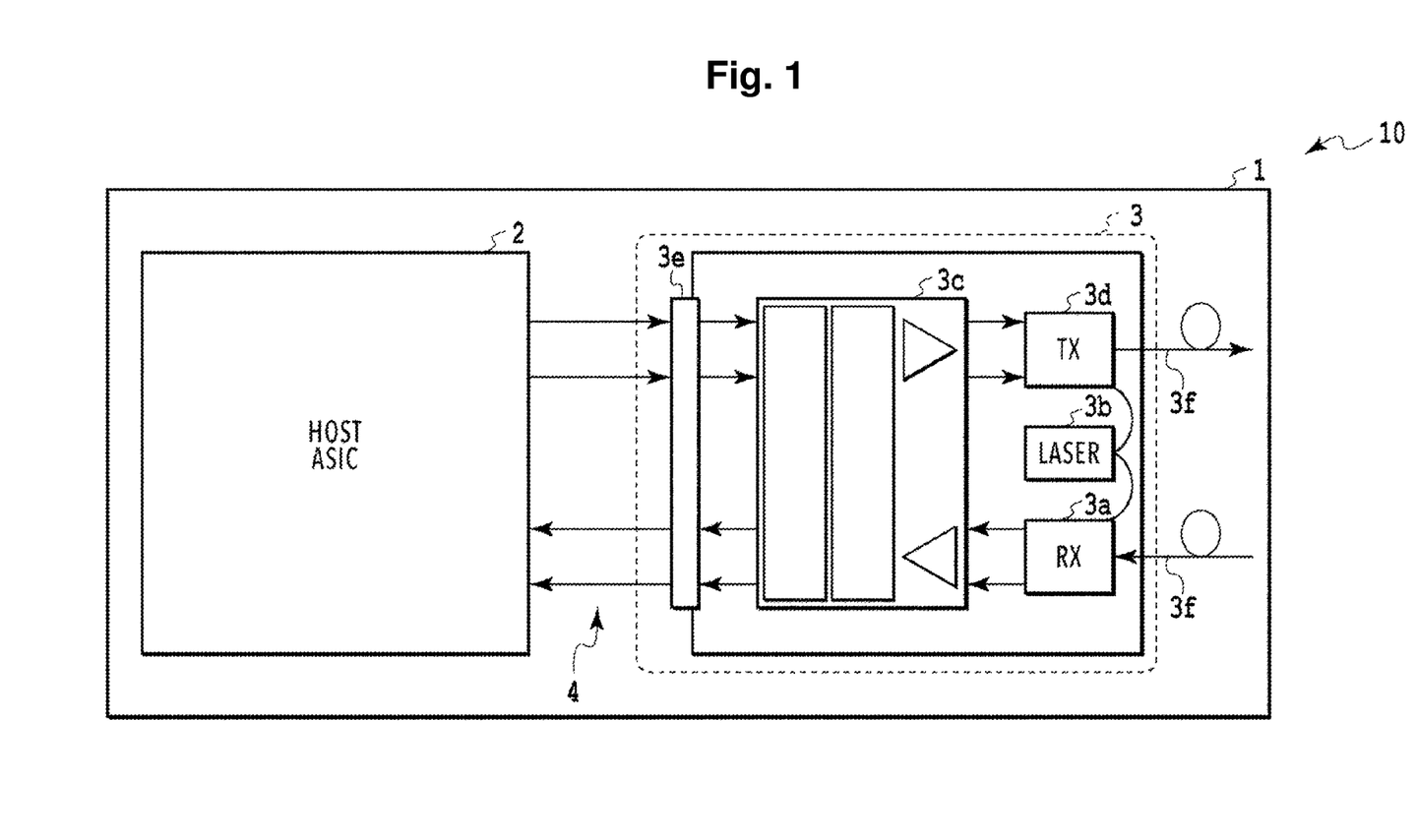
FIG. 1 is a top view diagram illustrating a schematic configuration of a network switch disclosed in non-patent literature 1.

FIG. 1 is a top view diagram illustrating a schematic configuration for the case in which a technique disclosed in non-patent literature 1 is applied to a network switch 10. With reference to FIG. 1, this network switch 10 includes, on the upper surface of a substrate 1, a network processor 2 and an optical transmitter-receiver 3 having a photoelectric conversion function, and these devices are connected to one another with metal wiring 4. The network processor 2 is an electronic circuit that provides core functions of the packet switch, and is typically configured as an application specific integrated circuit (ASIC) in many cases. The optical transmitter-receiver 3 is a small component including an optical receiver (RX) 3a configured inside as a module, a laser (LASER) 3b, an electrical-processing function unit 3c, and an optical transmitter (TX) 3d, and also includes a connector 3e, optical fibers 3f, and the like. This optical transmitter-receiver 3 enables a plurality of optical transmitter-receivers 3 to be arranged side by side on the substrate 1 and thereby achieve high-density packaging like tiles.

As for the optical transmitter-receiver 3, the optical receiver 3a, in the case of coherent detection, plays roles of selectively enhancing the optical signals having wavelengths close to that of the laser 3b out of the optical signals inputted from the connected optical fiber 3f and converting the enhanced optical signals into electrical signals by optical-electrical conversion. The electrical-processing function unit 3c plays roles of performing electrical-signal digital signal processing at the time when signals are sent to or received from the network processor 2 and amplifying electrical signals at the time of transmission and reception of optical signals. The optical transmitter 3d plays roles of performing electrical-optical conversion by modulating the light inputted from the laser 3b using electrical signals inputted from the electrical-processing function unit 3c, and outputting the resultant signals to the connected optical fiber 3f. The connector 3e is provided for the connection with the network processor 2.

In general, the packet switching function provided by the network processor 2 is a highly functional one that can specify a destination for each packet but consumes a large amount of electric power per processing capacity. Meanwhile, the optical switch generally requires time for switching paths, and thus the applications of the optical switch are limited to the ones in which paths are fixed or the ones for switching in units of flows that continue for a long time. However, as for the optical switch, the power consumption required for switching is smaller than that of the packet switch, and it is not dependent on the signal speed and has an approximately constant value.

Nowadays, to reduce electric power consumed in the optical network, the optical switches and the packet switch are combined, and a method is devised for the case in which the amount of signal flow using the same pair of input output ports is large with the traffic passing through the packet switch. Specifically, in such a case, an architecture called optical cut-through is applied in which the flow is not inputted to the packet switch, and paired input output ports are directly connected via optical switches.

Meanwhile, one of the recent demands for optical networks is the shift to the Internet protocol integrated network that links the service layer and the physical layer. In addition, it is important for optical networks that they can provide a large scale, a wide band, and high reliability and be built economically. Network control techniques are also required that are capable of quickly setting an optical physical network for the bandwidth requirement of the Internet protocol. A known technique related to this network control is a research promotion of generalized multi-protocol label switching (GMPLS) disclosed in non-patent literature 3.

In current optical networks, large capacities of switches/routers supporting the Internet protocol inevitably lead to high cost and high power-consumption. To address this, introducing optical switches and applying optical cut-through make it possible to perform dynamic optical path setting and reduce the processing in the switches/routers.

In the case of building an optical network system by connecting a plurality of packet switches, a configuration is employed in which the node of a communication origin is connected to the nearest packet switch and connected to the node of the communication partner via different packet switches. The reason is that if the node of the communication origin were connected to the nearest packet switch to the node of the communication partner which is far from the node of the communication origin, the transmission distance would be long, making wiring of optical fiber or the like difficult, and with increase in the transmission capacity of optical signals, the transmittable distance would be short. If the transmittable distance is short as in this case, it is impossible to connect the node of the communication origin to a packet switch at a distance. For the nodes, for example, client server computers or the like are employed. Note that the packet switch including a network processor 2 can be regarded as an electrical switch. Then, a combination of an electrical switch and an optical switch is called a hybrid switch. An example of a well-known technique related to a system configuration in which a plurality of such hybrid switches are connected is a photoelectric hybrid described in Patent Literature 1.

In the optical network system in which a plurality of packet switches are connected, even though the node of the communication origin is connected to the nearest packet switch, packet processing for transmitting and receiving optical signals between packet switches has to be performed by the packet switches. Thus, the processing in the packet switches that optical signals pass through increases and imposes a strain on the processing capacity, and also it causes a problem in that the increase in the processing in turn increases electric power consumption.

In brief, if a case in which existing network switches are applied to an optical network system built by connecting a plurality of packet switches is considered, there is a problem that the amount of processing in the packet switches is large, and operation with low electric power consumption is difficult. In addition, for existing network switches, if the condition in which a plurality of packet switches are connected is considered, as the transmission capacity of optical signals increases, the transmittable distance decreases, causing a problem that wide-range optical communication is difficult between the nodes of the communication origin and the communication partner.

CITATION LIST

Non-Patent Literature

Non-Patent Literature 1: "Consortium For On-Board Optics The Use of On-Board Optic Compliant Modules in Coherent Applications" COBO Release 1.0 Whitepaper (http://onboardoptics.org/wp-content/uploads/2019/05/COBO-CohOBO-AppNote-March-2018.pdf)

Non-Patent Literature 2: "Optical Connectivity Optaions for 400 Gbps and Higher On-Board Optics" COBO Connectivity Whitepaper, Revision 1.0 (http://onboardoptics.org/wp-content/uploads/2019/03/COBO-Optical-Connectivity-Whitepaper-March-2019.pdf)

Non-Patent Literature 3: "GMPLS-Based Photonic Multilayer Router (Hikari Router) Architecture: An Overview of Traffic Engineering and Signaling Technology" Kenichi Sato, Naoaki Yamanaka, Yoshihiro Takigawa, Masafumi Koga, Satoru Okamoto, Kohei Shiomoto, Eiji Oki, and Wataru Imajuku, NTT Corporation (IEEE Commun. Mag., vol. 40, pp. 96-101, March 2002.)

PATENT LITERATURE

Patent Literature 1: Japanese Patent No. 5681394

SUMMARY OF THE INVENTION

The present invention has been made to solve the foregoing problems. An object of the embodiments according to the present invention is to provide a photonics-electronics convergence switch with which even if an optical network system is built by connecting a plurality of packet switches, the amount of processing in the packet switches does not increase, the optical network system operates with low electric power consumption, and wide-range optical communication is possible between the nodes of the communication origin and the communication partner.

To achieve the foregoing object, an aspect of the present invention is a photonics-electronics convergence switch including a packet switch and a plurality of optical switches, in which the packet switch includes an electronic circuit and a plurality of optical transmitter-receivers provided near the electronic circuit and having a photoelectric conversion function, the plurality of optical switches include different types of optical switches, paths connecting between the electronic circuit and the plurality of optical transmitter-receivers are formed of wiring through which an electrical signal passes, paths connecting between the plurality of optical transmitter-receivers and the plurality of optical switches, paths connecting between two optical switches of the different types out of the plurality of optical switches, and paths connecting between the plurality of optical switches and an input-output port of the photonics-electronics convergence switch are formed of optical waveguides, and optical switches of the different types out of the plurality of optical switches cooperate to select a path through which an inputted optical signal is outputted to a different packet switch connected to the packet switch without passing through the electronic circuit, a path through which an optical signal inputted from the different packet switch is outputted to the different packet switch without passing through the electronic circuit, a path through which an inputted optical signal passes through the electronic circuit and is subjected to photoelectric conversion by the plurality of optical transmitter-receivers, and the optical signal obtained by the photoelectric conversion is outputted to the different packet switch, and a path through which an optical signal inputted from the different packet switch passes through the electronic circuit and is subjected to photoelectric conversion by the plurality of optical transmitter-receivers, and the optical signal obtained by the photoelectric conversion is outputted to the different packet switch.

Since in the above configuration, the packet switch includes the electronic circuit and the optical transmitter-receivers near the electronic circuit, and the optical switches of different types cooperate to make the path selection, it is possible to perform optical communication by connecting packet switches between the nodes of the communication origin and the communication partner. The paths selected include a path for executing optical cut-through by which inputted optical signals or optical signals inputted from a different packet switch connected to the packet switch are outputted to the different packet switch without passing through the electronic circuit. The paths selected also include a path through which inputted optical signals or optical signals inputted from the different packet switch pass through the electronic circuit and are subjected to photoelectric conversion by the optical transmitter-receivers, and the optical signals obtained by the photoelectric conversion are outputted to the different packet switch. With the configuration and functions described above, even if an optical network system is built by connecting a plurality of packet switches, by setting execution of optical cut-through as appropriate in the packet switches between the nodes, the amount of processing in the packet switches does not increase, and the optical network system operates with low electric power consumption, enabling wide-range optical communication between the nodes of the communication origin and the communication partner.

BRIEF DESCRIPTION OF DRAWINGS

FIG. 2 is a diagram illustrating a schematic configuration of a photonics-electronics convergence switch according to a preferred embodiment of the present invention. Part (A) is a plan view of the photonics-electronics convergence switch from the upper surface direction. Part (B) is a side cross-sectional view from the arrow IIB direction of a portion of part (A) in a state in which the photonics-electronics convergence switch is formed on a substrate.

DESCRIPTION OF EMBODIMENTS

Hereinafter, photonics-electronics convergence switches according to several embodiments of the present invention will be described in detail with reference to the drawings.

Figure 2A:
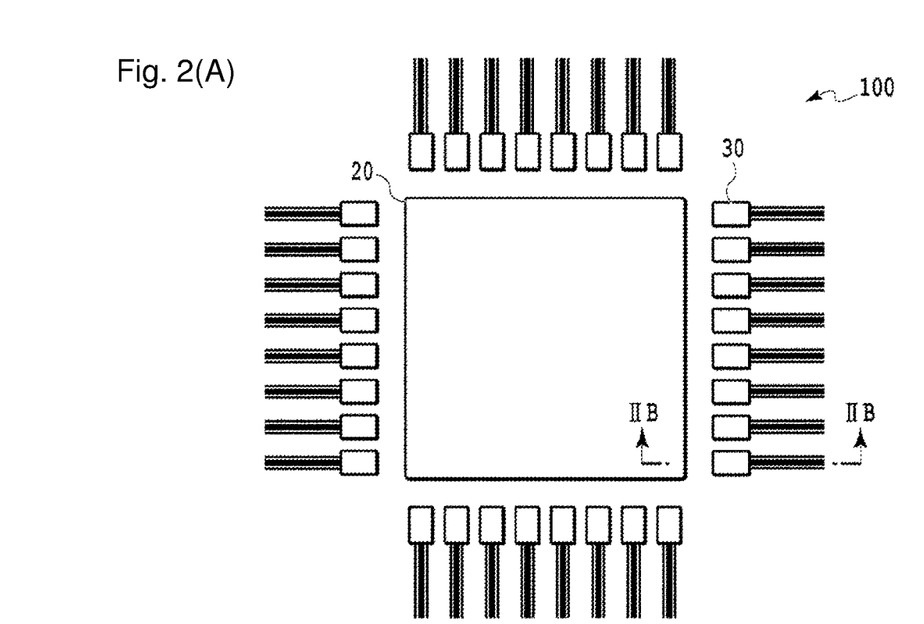
Figure 2B:
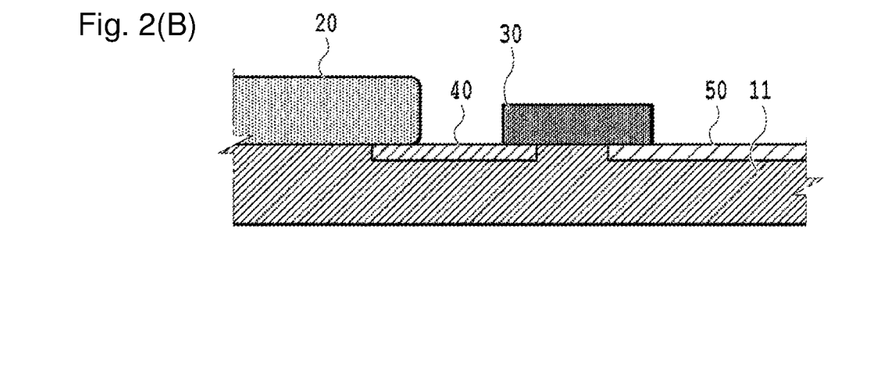

First, a technical overview of the photonics-electronics convergence switch according to a preferred embodiment of the present invention will be briefly described with reference to FIG. 2. FIG. 2 is a diagram illustrating a schematic configuration of a photonics-electronics convergence switch 100 according to the preferred embodiment of the present invention. FIG. 2(A) is a plan view of the photonics-electronics convergence switch 100 from the upper surface direction. FIG. 2(B) is a side cross-sectional view from the arrow IIB direction of a portion of FIG. 2(A) in a state in which the photonics-electronics convergence switch 100 is formed on a substrate 11.

With reference to FIGS. 2(A) and 2(B), the photonics-electronics convergence switch 100 includes a network processor 20 and a plurality of optical transmitter-receivers 30 having photoelectric conversion functions, the network processor 20 and the plurality of optical transmitter-receivers 30 composing a packet switch, and the photonics-electronics convergence switch 100 also includes a plurality of optical switches. Of these, the network processor 20 is an electronic circuit that controls the functions of the packet switch and is capable of receiving and outputting a large number of high-speed signals. Each optical transmitter-receiver 30 is provided near the network processor 20 and has a configuration the same as or similar to the optical transmitter-receiver 3 described with reference to FIG. 1, but to simplify it, only its outer shape is illustrated. The optical switches should preferably be waveguide optical switches made by using planar lightwave circuit (PLC) techniques. The optical switches include different types of optical switches. Then, as for the photonics-electronics convergence switch 100, different types of optical switches, out of the optical switches, cooperate to perform path selection such that inputted optical signals are outputted without passing through the network processor 20, which operation is called optical cut-through.

This photonics-electronics convergence switch 100 is based on the assumption that an optical network system for performing optical communication is configured by connecting packet switches as nodes between a communication origin and a communication partner, and in the photonics-electronics convergence switch 100, different types of optical switches cooperate to make path selection. The paths selected include a path through which inputted optical signals are outputted to a different packet switch connected to the packet switch without passing through the network processor 20. The paths selected also include a path through which optical signals inputted from a different packet switch are outputted to a different packet switch without passing through the network processor 20. The paths selected further include a path through which inputted optical signals pass through the network processor 20 and are subjected to photoelectric conversion by optical transmitter-receivers 30, the optical signals obtained by the photoelectric conversion are outputted to a different packet switch. In addition, the paths selected also include a path through which optical signals inputted from a different packet switch pass through the network processor 20 and are subjected to photoelectric conversion by optical transmitter-receivers 30, and the optical signals obtained by the photoelectric conversion are outputted to a different packet switch. Note that the different types of optical switches include not only the optical relay switch 60 illustrated in FIG. 2 but also various types such as path selection switches and path setting switches related to input and output.

In this photonics-electronics convergence switch 100, metal wiring 40 which is wiring through which electrical signals pass is used for the paths connecting between the network processor 20 and the optical transmitter-receivers 30. For the paths connecting between the optical transmitter-receivers 30 and the optical switches, optical waveguides 50 are used. These optical waveguides 50 should also preferably be used for the paths connecting between two optical switches of different types out of the optical switches and the paths connecting between the optical transmitter-receivers 30 or optical switches and the input-output ports. Routing of the traces of the optical waveguides 50 is actually complicated on the assumption that different types of optical switches are used among the optical switches. Thus, in FIG. 2(A), only the portions of optical waveguides $50_{IN}$ on the input side and optical waveguides $50_{OUT}$ on the output side are illustrated regarding the optical relay switch 60, and most of them are omitted.

In the photonics-electronics convergence switch 100, the network processor 20, the optical transmitter-receivers 30, the optical switches, the metal wiring 40, and the optical waveguides 50 are formed on the upper surface of one and the same substrate 11. Then, the metal wiring 40 and the optical waveguides 50 compose an interposer with optical waveguides. In this formed state, the network processor 20, the optical transmitter-receivers 30, and the optical switches should preferably be arranged in one and the same plane of the upper surface of the interposer with optical waveguides. Note that at least some of the optical switches may be integrated as part of the optical waveguides 50 in the interposer with optical waveguides. In addition, in the area of the optical waveguides 50 of the optical switches, not only the above various types of switches but also optical function devices such as arrayed waveguide gratings (AWG) may be provided.

As for the photonics-electronics convergence switch 100 having such an outline configuration, description will be made below of embodiments in which even if an optical network system is built by connecting a plurality of packet switches, the amount of processing of the packet switches does not increase, and the optical network system operates with low electric power consumption. Note that the photonics-electronics convergence switch 100 in this case is based on the assumption that wide-range optical communication is performed by connecting packet switches as nodes between a communication origin and a communication partner.

Embodiment 1

Figure 3:
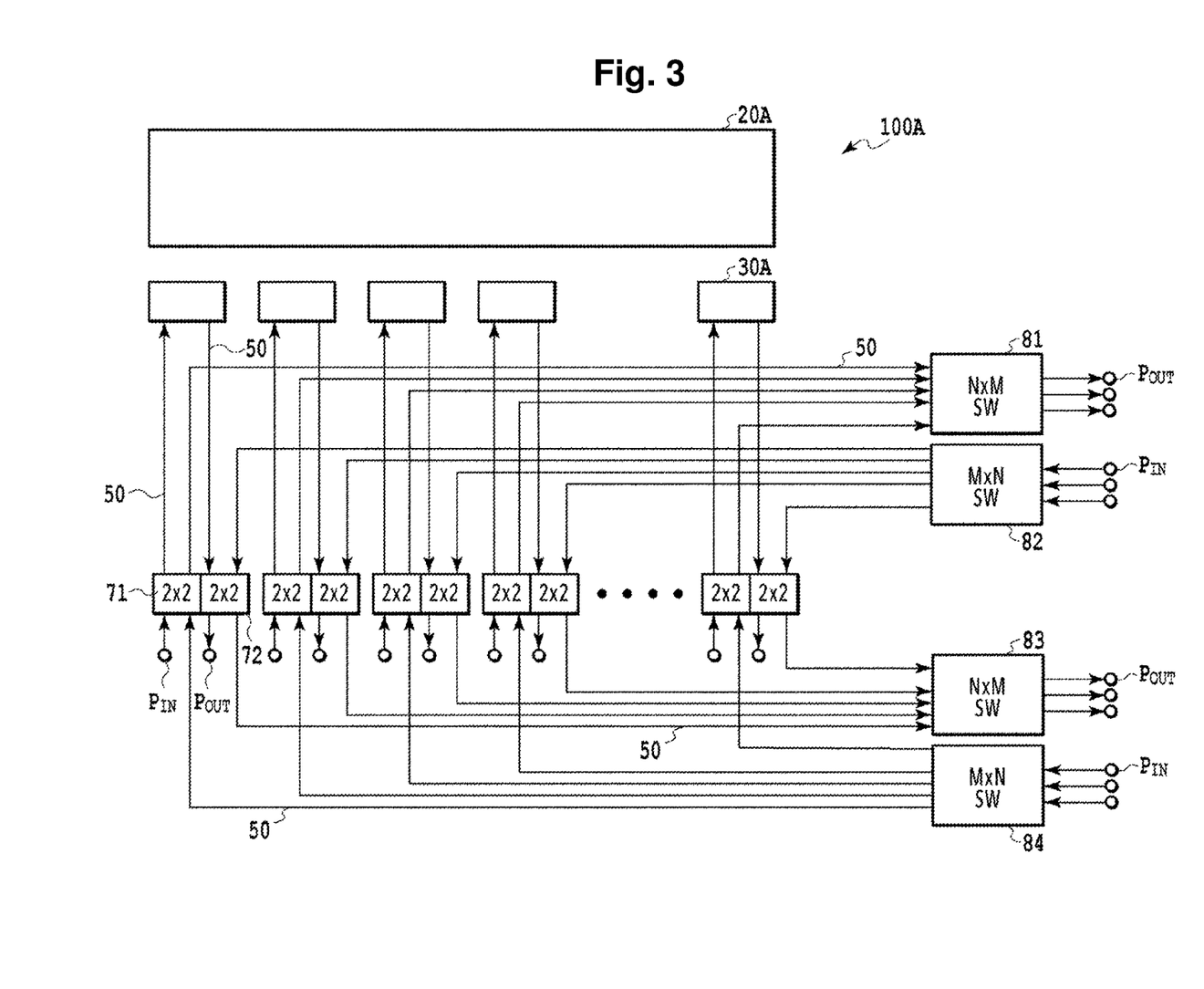
FIG. 3 is a top view diagram illustrating a schematic configuration of a photonics-electronics convergence switch according to Embodiment 1 of the present invention.

FIG. 3 is a top view diagram illustrating a schematic configuration of a photonics-electronics convergence switch 100A according to Embodiment 1 of the present invention.

With reference to FIG. 3, this photonics-electronics convergence switch 100A includes a network processor 20A which is an electronic circuit that controls the functions of the packet switch, a plurality of optical transmitter-receivers 30A having photoelectric conversion functions, and a plurality of optical switches. The network processor 20A and the optical transmitter-receivers 30A compose the packet switch. The optical switches include, as different types of optical switches, a plurality of optical-input-path selection switches 71 and a plurality of optical-output-path selection switches 72, and a pair of optical-relay-input-path setting switches 82 and 84 and a pair of optical-relay-output-path setting switches 81 and 83. The optical-relay-input-path setting switches 82 and 84 are of an N×M type (N inputs and M outputs), which is on the premise that N and M are natural numbers, and the relationship N>M holds. The N×M type means that it has N inputs and M outputs, and the same is true of the following description. In addition, each optical-input-path selection switch 71 is connected to an input port $P_{IN}$, and each optical-output-path selection switch 72 is connected to an output port $P_{OUT}$.

In this photonics-electronics convergence switch 100A, wiring through which electrical signals pass, such as the above metal wiring, is used for the paths connecting between the network processor 20A and the optical transmitter-receivers 30A. For the paths connecting between the optical transmitter-receivers 30A and the optical-input-path selection switches 71 and between the optical transmitter-receivers 30A and the optical-output-path selection switches 72, optical waveguides 50 are used. Then, the optical waveguides 50 are also used for the paths connecting between the optical-input-path selection switches 71 and the optical-relay-input-path setting switch 84 on one side and between the optical-input-path selection switches 71 and the optical-relay-output-path setting switch 81 on the other side. Further, the optical waveguides 50 are also used for the paths connecting between the optical-output-path selection switches 72 and the optical-relay-input-path setting switch 82 on the other side and between the optical-output-path selection switches 72 and the optical-relay-output-path setting switch 83 on the one side. In addition, the optical waveguides 50 are also used for the paths connecting between the optical-input-path selection switches 71 and the input ports $P_{IN}$ and the paths between the optical-relay-input-path setting switches 82 and 84 and dedicated input ports $P_{IN}$. In addition, the optical waveguides 50 are also used for the paths connecting between the optical-output-path selection switches 72 and the output ports $P_{OUT}$ and the paths connecting between the optical-relay-output-path setting switches 81 and 83 and dedicated output ports $P_{OUT}$. Note that here, the ports connected to the optical-relay-input-path setting switches 82 and 84 are regarded as dedicated input ports $P_{IN}$, and the ports connected to the optical-relay-output-path setting switches 81 and 83 are regarded as dedicated output ports $P_{oUT}$.

Each optical transmitter-receiver 30A converts inputted optical signals into electrical signals and transmits the electrical signals to the network processor 20A, and each optical transmitter-receiver 30A also outputs optical signals according to electrical signals from the network processor 20A. Specifically, each optical transmitter-receiver 30A converts optical signals inputted from the corresponding input port $P_{IN}$ via the corresponding optical-input-path selection switch 71 into electrical signals by optical-electrical conversion and transmits the electrical signals to the network processor 20A. Each optical transmitter-receiver 30A converts electrical signals from the network processor 20A into optical signals by electrical-optical conversion and outputs the optical signals to the corresponding output port $P_{OUT}$ via the corresponding optical-output-path selection switch 72.

Each optical-input-path selection switch 71 is provided between an input port $P_{IN}$ and the corresponding optical transmitter-receiver 30A. Then, each optical-input-path selection switch 71 can function as a through connection to select the direction path that connects the input port $P_{IN}$ and the corresponding optical transmitter-receiver 30A. Each optical-input-path selection switch 71 can also function as a through connection to select the direction path that connects a dedicated input port $P_{IN}$ of the optical-relay-input-path setting switch 84 on the one side and a dedicated output port $P_{oUT}$ of the optical-relay-output-path setting switch 81 on the other side. Further, each optical-input-path selection switch 71 can function as a cross connection to select the direction path that connects the input port $P_{IN}$ and a dedicated output port $P_{OUT}$ of the optical-relay-output-path setting switch 81 on the other side. In addition, each optical-input-path selection switch 71 can function as a cross connection to select the direction path that connects the corresponding optical transmitter-receiver 30A and a dedicated input port $P_{IN}$ of the optical-relay-input-path setting switch 84 on the one side. Each optical-input-path selection switch 71 illustrated in FIG. 3 is of a 2×2 type.

Each optical-output-path selection switch 72 is provided between the corresponding optical transmitter-receiver 30A and an output port $P_{OUT}$. Then, each optical-output-path selection switch 72 can function as a through connection to select the direction path that connects the output port $P_{OUT}$ and the corresponding optical transmitter-receiver 30A. Each optical-output-path selection switch 72 can also function as a through connection to select the direction path that connects a dedicated output port $P_{OUT}$ of the optical-relay-output-path setting switch 83 on the one side and a dedicated input port $P_{IN}$ of the optical-relay-input-path setting switch 82 on the other side. Further, each optical-output-path selection switch 72 can function as a cross connection to select the direction path that connects the output port $P_{OUT}$ and a dedicated input port $P_{IN}$ of the optical-relay-input-path setting switch 82 on the other side. In addition, each optical-output-path selection switch 72 can select the direction path that connects a dedicated output port $P_{OUT}$ of the optical-relay-output-path setting switch 83 on the one side and the corresponding optical transmitter-receiver 30A. Each optical-output-path selection switch 72 illustrated in FIG. 3 is of a 2×2 type.

Specifically, in the photonics-electronics convergence switch 100A, the optical-relay-input-path setting switch 84 on the one side receives input of optical signals from a different packet switch connected to the packet switch through the dedicated input ports $P_{IN}$. Then, the optical-relay-input-path setting switch 84 transmits the inputted optical signals to each optical-input-path selection switch 71 individually. The optical-relay-input-path setting switch 82 on the other side receives input of optical signals from a different packet switch connected to the packet switch through the dedicated input ports $P_{IN}$. Then, the optical-relay-input-path setting switch 82 transmits the inputted optical signals to each optical-output-path selection switch 72 individually. The optical-relay-output-path setting switch 83 on the one side transmits optical signals transmitted from the optical-output-path selection switches 72 to a different packet switch. Further, the optical-relay-output-path setting switch 81 on the other side transmits optical signals outputted from the optical-input-path selection switches 71 to a different packet switch.

The following describes the basic operation of the photonics-electronics convergence switch 100A. On the assumption here, the photonics-electronics convergence switch 100A in this case is connected to the signal source of a communication origin, and the nodes the packet switches of which are connected are interposed. Thus, the optical network system on the assumption here has a configuration in which optical communication is performed with the signal source of the node of a communication partner in such a way. In addition, on the assumption here, in the optical network system to which the photonics-electronics convergence switch 100A is applied, different packet switches connected to the packet switch are unspecified nodes. Note that for controlling the optical switches, techniques can be employed such as directly connecting between the input-output ports according to requests from the client or directly connecting between appropriate input-output ports according to the design by the network operator, but details are not discussed here.

Assume a case in which the optical-input-path selection switch 71 makes direction-path selection. In this case, as one of the through connections, the optical-input-path selection switch 71 connects the input port $P_{IN}$ and the corresponding optical transmitter-receiver 30A. With this connection, optical signals inputted from the input port $P_{IN}$ are transmitted to the optical transmitter-receiver 30A, and the optical transmitter-receiver 30A converts the optical signals into electrical signals by optical-electrical conversion and transmits the electrical signals to the network processor 20A. As the other one of the through connections, the optical-input-path selection switch 71 connects a dedicated input port $P_{IN}$ of the optical-relay-input-path setting switch 84 on the one side and a dedicated output port $P_{OUT}$ of the optical-relay-output-path setting switch 81 on the other side. With this connection, optical signals inputted from a different packet switch to the optical-relay-input-path setting switch 84 through the dedicated input port $P_{IN}$ are transmitted to the optical-relay-output-path setting switch 81. The optical signals transmitted to the optical-relay-output-path setting switch 81 are transmitted to a different packet switch through the dedicated output port $P_{oUT}$.

In the direction-path selection of the optical-input-path selection switch 71, as one of the cross connections, the optical-input-path selection switch 71 connects the input port $P_{IN}$ and a dedicated output port $P_{OUT}$ of the optical-relay-output-path setting switch 81 on the other side. With this connection, optical signals inputted from the input port $P_{IN}$ are transmitted to the optical-relay-output-path setting switch 81. The optical signals transmitted to the optical-relay-output-path setting switch 81 are transmitted to a different packet switch through the dedicated output port $P_{OUT}$. As the other one of the cross connections, the optical-input-path selection switch 71 connects the corresponding optical transmitter-receiver 30A and the optical-relay-input-path setting switch 84 on the one side. With this connection, optical signals inputted from a different packet switch to the optical-relay-input-path setting switch 84 through the dedicated input port $P_{IN}$ are transmitted to the optical transmitter-receiver 30A. The optical transmitter-receivers 30A convert the optical signals into electrical signals by optical-electrical conversion and transmits the electrical signals to the network processor 20A.

Assume a case in which the optical-output-path selection switch 72 makes direction-path selection. In this case, as one of the through connections, the optical-output-path selection switch 72 connects the output port $P_{OUT}$ and the corresponding optical transmitter-receiver 30A. With this connection, the optical transmitter-receiver 30A converts electrical signals outputted from the network processor 20A into optical signals by electrical-optical conversion, transmits the optical signals to the output port $P_{OUT}$, and outputs it. As the other one of the through connections, the optical-output-path selection switch 72 connects a dedicated output port $P_{OUT}$ of the optical-relay-output-path setting switch 83 on the one side and a dedicated input port $P_{IN}$ of the optical-relay-input-path setting switch 82 on the other side. With this connection, optical signals inputted from a different packet switch to the optical-relay-input-path setting switch 82 are transmitted to a different packet switch through the dedicated output port $P_{OUT}$ of the optical-relay-output-path setting switch 83.

In the direction-path selection of the optical-output-path selection switch 72, as one of the cross connections, the optical-output-path selection switch 72 connects the output port $P_{OUT}$ and a dedicated input port $P_{IN}$ of the optical-relay-input-path setting switch 82 on the other side. With this connection, optical signals inputted to the optical-relay-input-path setting switch 82 from a different packet switch are transmitted to the output ports $P_{OUT}$ and outputted. In addition, as the other one of the cross connections, the optical-output-path selection switch 72 connects a dedicated output port $P_{OUT}$ of the optical-relay-output-path setting switch 83 on the one side and the corresponding optical transmitter-receiver 30A. With this connection, optical signals from the optical transmitter-receiver 30A are transmitted to the different packet switch through the dedicated output port $P_{OUT}$ of the optical-relay-output-path setting switch 83.

In the photonics-electronics convergence switch 100A of Embodiment 1, different types of optical switches out of the optical switches cooperate to select paths, which enables optical communication through packet switches connected between the nodes of the communication origin and the communication partner. By the path selection, optical cut-through can be executed, by which inputted optical signals or optical signals inputted from a different packet switch are outputted to a different packet switch without passing through the network processor 20A. This optical cut-through can be effectively performed without imposing a signal processing burden that consumes electric power on the network processor 20A. By the path selection interposing the network processor 20A, the photonics-electronics convergence switch 100A can convert inputted optical signals or optical signals inputted from a different packet switch by photoelectric conversion of the optical transmitter-receivers 30A and output the obtained optical signals to a different packet switch. By the path selection described above, the optical cut-through can be set as appropriate in the different packet switches corresponding to the nodes on the path from the packet switch of the photonics-electronics convergence switch 100A at the node of the communication origin to the node of the communication partner.

In the photonics-electronics convergence switch 100A, the optical-relay-input-path setting switches 82 and 84 and the optical-relay-output-path setting switches 81 and 83 are connected to different packet switches of unspecified nodes. Thus, even in the case in which an optical network system is built by connecting a plurality of packet switches, the amount of processing in the packet switches does not increase, the optical network system operates with low electric power consumption, and this enables wide-range optical communication between the nodes of the communication origin and the communication partner.

Embodiment 2

Figure 4:
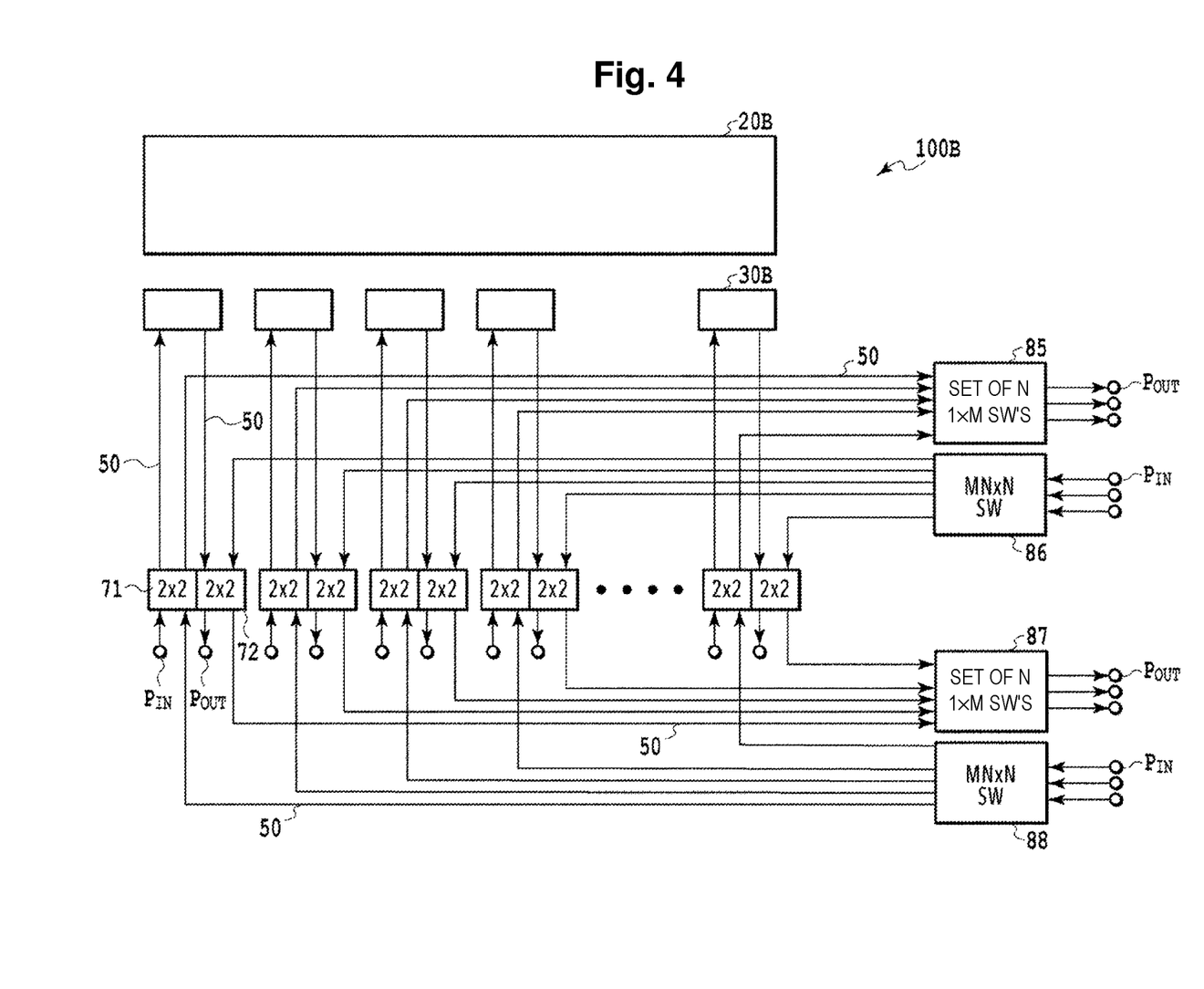
FIG. 4 is a top view diagram illustrating a schematic configuration of a photonics-electronics convergence switch according to Embodiment 2 of the present invention.

FIG. 4 is a top view diagram illustrating a schematic configuration of a photonics-electronics convergence switch 100B according to Embodiment 2 of the present invention.

With reference to FIG. 4, this photonics-electronics convergence switch 100B includes a network processor 20B which is an electronic circuit that controls the functions of the packet switch, a plurality of optical transmitter-receivers 30B having photoelectric conversion functions, and a plurality of optical switches. The network processor 20B and the optical transmitter-receivers 30B compose the packet switch. The optical switches include, as different types of optical switches, a plurality of optical-input-path selection switches 71 and a plurality of optical-output-path selection switches 72, and in addition include a pair of optical-relay-input-path setting switches 86 and 88 and a pair of optical-relay-output-path setting switches 85 and 87.

In this photonics-electronics convergence switch 100B, it is determined that the connections of each of the optical-relay-input-path setting switches 86 and 88 and the connections of each of the optical-relay-output-path setting switches 85 and 87 to a plurality of different packet switches are M nodes. Thus, each of the paired optical-relay-output-path setting switches 85 and 87 includes a set of N switches of a 1×M type, and each of the paired optical-relay-input-path setting switches 86 and 88 is of an MN×N type. Note that the relationship between N and M is the same as in Embodiment 1. Details of the configuration other than this point are common to the photonics-electronics convergence switch 100A according to Embodiment 1.

Also in the photonics-electronics convergence switch 100B of Embodiment 2, different types of optical switches out of the optical switches cooperate to select paths, which enables optical communication through packet switches connected between the nodes of the communication origin and the communication partner. By the path selection, optical cut-through can be executed, by which inputted optical signals or optical signals inputted from a different packet switch are transmitted to a different packet switch without passing through the network processor 20B. This optical cut-through can be effectively performed without imposing a signal processing burden that consumes electric power on the network processor 20B. By the path selection interposing the network processor 20B, the photonics-electronics convergence switch 100B can convert inputted optical signals or optical signals inputted from a different packet switch by photoelectric conversion of the optical transmitter-receivers 30B and output the obtained optical signals to a different packet switch. By the path selection described above, the optical cut-through can be set as appropriate in the different packet switches corresponding to the nodes on the path from the packet switch of the photonics-electronics convergence switch 100B at the node of the communication origin to the node of the communication partner.

In the photonics-electronics convergence switch 100B, it is determined that the connections of each of the optical-relay-input-path setting switches 86 and 88 and the connections of each of the optical-relay-output-path setting switches 85 and 87 to a plurality of different packet switches are M nodes. Thus, for the photonics-electronics convergence switch 100B of Embodiment 2, even if an optical network system is built by connecting packet switches without considering the number of optical waveguides used, the amount of processing in the packet switches does not increases, and the optical network system operates with low electric power consumption. This enables wide-range optical communication between the nodes of the communication origin and the communication partner as in the case of Embodiment 1.

Embodiment 3

Figure 5:
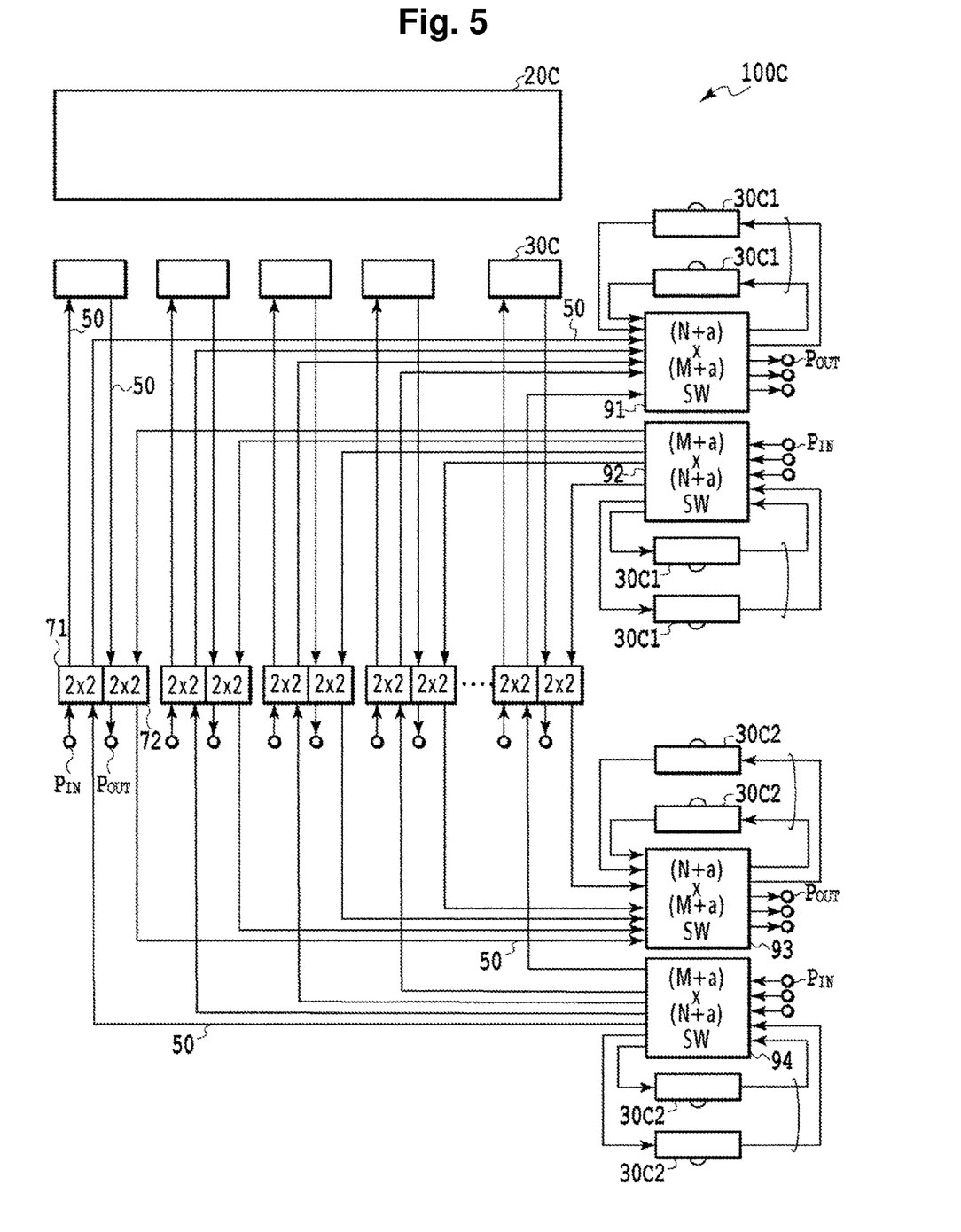
FIG. 5 is a top view diagram illustrating a schematic configuration of a photonics-electronics convergence switch according to Embodiment 3 of the present invention.

FIG. 5 is a top view diagram illustrating a schematic configuration of a photonics-electronics convergence switch 100C according to Embodiment 3 of the present invention.

With reference to FIG. 5, this photonics-electronics convergence switch 100C includes a network processor 20C which is an electronic circuit that controls the functions of the packet switch, a plurality of optical transmitter-receivers 30C having photoelectric conversion functions, and a plurality of optical switches. The network processor 20C and the optical transmitter-receivers 30C compose the packet switch. In this photonics-electronics convergence switch 100C, a plurality of optical transmitter-receivers 30C1 and 30C2, which are part of the optical transmitter-receivers 30C, do not perform signal transmission and reception to and from the network processor 20B. Hence, they can be provided away from the network processor 20B compared to the other optical transmitter-receivers 30C. However, the optical transmitter-receivers 30C1 and 30C2 may be located near the network processor 20B. These optical transmitter-receivers 30C1 and 30C2 have a regeneration relay function that converts inputted optical signals into electrical signals by optical-electrical conversion, turns back the electrical signals and converts the electrical signals into optical signals by electrical-optical conversion, and outputs the optical signals.

The optical transmitter-receivers 30C1 are paired, and a pair of them is provided, out of a pair of optical-relay-input-path setting switches 92 and 94 and a pair of optical-relay-output-path setting switches 91 and 93, to each of the optical-relay-output-path setting switch 91 and the optical-relay-input-path setting switch 92. However, this pair configuration is an example, and practically, the optical transmitter-receivers 30C1 can be provided so as to be a set of "a" pieces (where "a" is a natural number not larger than M). The optical transmitter-receivers 30C1 receive input of optical signals outputted from the optical-relay-output-path setting switch 91 or the optical-relay-input-path setting switch 92, convert the optical signals into electrical signals by optical-electrical conversion, turn back the electrical signals and convert the electrical signals into optical signals by electrical-optical conversion, and input the optical signals into the optical-relay-output-path setting switch 91 or the optical-relay-input-path setting switch 92. Note that the optical-relay-output-path setting switch 91 and the optical-relay-input-path setting switch 92 here are based on the assumption of cases of relatively long distance, and in such cases, the regeneration relay function by the optical transmitter-receivers 30C1 works effectively to keep transmission performance for optical signals.

The optical transmitter-receivers 30C2 are paired, and a pair of them is provided, out of the pair of optical-relay-input-path setting switches 92 and 94 and the pair of optical-relay-output-path setting switches 91 and 93, to each of the optical-relay-output-path setting switch 93 and the optical-relay-input-path setting switch 94. This pair configuration is also an example, and practically, the optical transmitter-receivers 30C2 can be provided so as to be a set of "a" pieces. The optical transmitter-receivers 30C2 receive input of optical signals outputted from the optical-relay-output-path setting switch 93 or the optical-relay-input-path setting switch 94, convert the optical signals into electrical signals by optical-electrical conversion, turn back the electrical signals and convert the electrical signals into optical signals by electrical-optical conversion, and inputs the optical signals into the optical-relay-output-path setting switch 93 or the optical-relay-input-path setting switch 94. Note that the optical-relay-output-path setting switch 93 and the optical-relay-input-path setting switch 94 here are also based on the assumption of cases of long distance to some extent. However, if the distance is short, it is not necessary to provide the optical transmitter-receivers 30C2. Specifically, the optical transmitter-receivers 30C1 and 30C2 are provided to at least one of the pairs composed by combining the pair of optical-relay-input-path setting switches 92 and 94 and the pair of optical-relay-output-path setting switches 91 and 93, the one being farther from the packet switch.

Since the optical transmitter-receivers 30C1 and 30C2 as above use sets of "a" input-output systems, each of the paired optical-relay-output-path setting switches 91 and 93 is of an (N+a)×(M+a) type. For the same reason, each of the paired optical-relay-input-path setting switches 92 and 94 is of an (M+a)×(N+a) type. Note that the relationship between N and M is also the same as in the case of Embodiment 1. Details of the configuration other than this point are common to the photonics-electronics convergence switch 100A according to Embodiment 1.

Also in the photonics-electronics convergence switch 100C of Embodiment 3, different types of optical switches out of the optical switches cooperate to select paths, which enables optical communication through packet switches connected between the nodes of the communication origin and the communication partner. The photonics-electronics convergence switch 100C can make a path selection to execute optical cut-through, by which inputted optical signals or optical signals inputted from a different packet switch are transmitted to a different packet switch without passing through the network processor 20C. This optical cut-through can be effectively performed without imposing a signal processing burden that consumes electric power on the network processor 20C. By a path selection, inputted optical signals or optical signals inputted from a different packet switch can pass through the network processor 20C and be subjected to photoelectric conversion by the optical transmitter-receivers 30C, and obtained optical signals can be outputted to a different packet switch. By the path selection described above, the photonics-electronics convergence switch 100C is capable of setting the optical cut-through as appropriate in the packet switches corresponding to the nodes on the path from the packet switch of the photonics-electronics convergence switch 100C at the node of the communication origin to the node of the communication partner.

In the photonics-electronics convergence switch 100C, the optical transmitter-receivers 30C1 and 30C2 having a regeneration relay function are provided to one of the pairs composed by combining the optical-relay-input-path setting switches 92 and 94 and the optical-relay-output-path setting switches 91 and 93, the one being farther from the packet switch. With this configuration of the photonics-electronics convergence switch 100C of Embodiment 3, even if an optical network system is built by connecting a plurality of packet switches, the transmission performance does not deteriorate, the amount of processing of the packet switches does not increase, and the optical network system operates with low electric power consumption. This enables wide-range optical communication between the nodes of the communication origin and the communication partner as in the case of Embodiment 1.

The invention claimed is:

1. A photonics-electronics convergence switch comprising a packet switch and a plurality of optical switches, wherein
   the packet switch includes an electronic circuit and a plurality of optical transmitter-receivers provided near the electronic circuit and having a photoelectric conversion function,
   the plurality of optical switches include different types of optical switches,
   paths connecting between the electronic circuit and the plurality of optical transmitter-receivers are formed of wiring through which an electrical signal passes,
   paths connecting between the plurality of optical transmitter-receivers and the plurality of optical switches, paths connecting between two optical switches of the different types out of the plurality of optical switches, and paths connecting between the plurality of optical switches and an input-output port of the photonics-electronics convergence switch are formed of optical waveguides, and
   optical switches of the different types out of the plurality of optical switches cooperate to select
   a path through which an inputted optical signal is outputted to a different packet switch connected to the packet switch without passing through the electronic circuit,
   a path through which an optical signal inputted from the different packet switch is outputted to the different packet switch without passing through the electronic circuit,
   a path through which an inputted optical signal passes through the electronic circuit and is subjected to photoelectric conversion by the plurality of optical transmitter-receivers, and the optical signal obtained by the photoelectric conversion is outputted to the different packet switch, and
   a path through which an optical signal inputted from the different packet switch passes through the electronic circuit and is subjected to photoelectric conversion by the plurality of optical transmitter-receivers, and the optical signal obtained by the photoelectric conversion is outputted to the different packet switch.

2. The photonics-electronics convergence switch according to claim 1, wherein
   the plurality of optical switches include a plurality of optical-input-path selection switches and a plurality of optical-output-path selection switches, and a pair of optical-relay-input-path setting switches and a pair of optical-relay-output-path setting switches,
   paths connecting between the plurality of optical-input-path selection switches and one of the pair of the optical-relay-input-path setting switches on one side and between the plurality of optical-input-path selection switches and one of the pair of the optical-relay-output-path setting switches on the other side and paths connecting between the plurality of optical-output-path selection switches and one of the pair of the optical-relay-input-path setting switches on the other side and between the plurality of optical-output-path selection switches and one of the pair of the optical-relay-output-path setting switches on the one side are formed of the optical waveguides, the one of the pair of the optical-relay-input-path setting switches on the one side transmits optical signals inputted from the different packet switch through a dedicated input port to each of the optical-input-path selection switches individually, the one of the pair of the optical-relay-input-path setting switches on the other side transmits optical signals inputted from the different packet switch through the dedicated input port to each of the optical-output-path selection switches individually, the one of the pair of the optical-relay-output-path setting switches on the one side transmits optical signals transmitted from the plurality of optical-output-path selection switches to the different packet switch through a dedicated output port, and the one of the pair of the optical-relay-output-path setting switches on the other side transmits optical signals transmitted from the plurality of optical-input-path selection switches to the different packet switch through the dedicated output port.

3. The photonics-electronics convergence switch according to claim 2, wherein each of the optical-input-path selection switches is provided between the input port and a corresponding one of the optical transmitter-receivers, functions as a through connection to connect between the input port and the corresponding one of the optical transmitter-receivers or connect between the dedicated input port of the one of the pair of the optical-relay-input-path setting switches on the one side and the dedicated output port of the one of the pair of the optical-relay-output-path setting switches on the other side, and functions as a cross connection to connect between the input port and the dedicated output port of the one of the pair of the optical-relay-output-path setting switches on the other side or connect between the corresponding one of the optical transmitter-receivers and the dedicated input port of the one of the pair of the optical-relay-input-path setting switches on the one side, and each of the optical-output-path selection switches is provided between a corresponding one of the optical transmitter-receivers and the output port, functions as a through connection to connect between the output port and the corresponding one of the optical transmitter-receivers or connect the dedicated output port of the one of the pair of the optical-relay-output-path setting switches on the one side and the dedicated input port of the one of the pair of the optical-relay-input-path setting switches on the other side, and functions as a cross connection to connect between the output port and the dedicated input port of the one of the pair of the optical-relay-input-path setting switches on the other side or connect the dedicated output port of the one of the pair of the optical-relay-output-path setting switches on the one side and the corresponding one of the optical transmitter-receivers.

4. The photonics-electronics convergence switch according to claim 3, wherein the pair of the optical-relay-input-path setting switches and the pair of the optical-relay-output-path setting switches are connected to a plurality of the different packet switches.

5. The photonics-electronics convergence switch according to claim 3, wherein at least some of the optical transmitter-receivers have a regeneration relay function that converts an inputted optical signal into an electrical signal by optical-electrical conversion, turns back the electrical signal and converts the electrical signal into an optical signal by electrical-optical conversion, and outputs the optical signal, and each of the optical transmitter-receivers having the regeneration relay function receives input of an optical signal outputted from one of the optical-relay-input-path setting switch and the optical-relay-output-path setting switch included in at least one of the pairs composed by combining the pair of the optical-relay-input-path setting switches and the pair of the optical-relay-output-path setting switches, the one of the pairs being farther from the packet switch, converts the optical signal into an electrical signal by the optical-electrical conversion, turns back the electrical signal and converts the electrical signal into an optical signal by the electrical-optical conversion, and inputs the optical signal into the one of the optical-relay-input-path setting switch and the optical-relay-output-path setting switch.

6. The photonics-electronics convergence switch according to claim 1, wherein each of the optical switches is a waveguide optical switch fabricated using a planar lightwave circuit (PLC) technique, the electronic circuit, the plurality of optical transmitter-receivers, the plurality of optical switches, the wiring, and the optical waveguides are formed on an upper surface of one and the same substrate, the wiring and the optical waveguides compose an interposer with optical waveguides, and the electronic circuit, the plurality of optical transmitter-receivers, and the plurality of optical switches are arranged, in the formed state, on one and the same plane of an upper surface of the interposer with optical waveguides.

7. The photonics-electronics convergence switch according to claim 6, wherein at least some of the optical switches are integrated as part of the optical waveguides in the interposer with optical waveguides.

8. The photonics-electronics convergence switch according to claim 2, wherein each of the optical switches is a waveguide optical switch fabricated using a planar lightwave circuit (PLC) technique, the electronic circuit, the plurality of optical transmitter-receivers, the plurality of optical switches, the wiring, and the optical waveguides are formed on an upper surface of one and the same substrate, the wiring and the optical waveguides compose an interposer with optical waveguides, and the electronic circuit, the plurality of optical transmitter-receivers, and the plurality of optical switches are arranged, in the formed state, on one and the same plane of an upper surface of the interposer with optical waveguides.

9. The photonics-electronics convergence switch according to claim 3, wherein each of the optical switches is a waveguide optical switch fabricated using a planar lightwave circuit (PLC) technique, the electronic circuit, the plurality of optical transmitter-receivers, the plurality of optical switches, the wiring, and the optical waveguides are formed on an upper surface of one and the same substrate, the wiring and the optical waveguides compose an interposer with optical waveguides, and the electronic circuit, the plurality of optical transmitter-receivers, and the plurality of optical switches are arranged, in the formed state, on one and the same plane of an upper surface of the interposer with optical waveguides.

10. The photonics-electronics convergence switch according to claim 4, wherein each of the optical switches is a waveguide optical switch fabricated using a planar lightwave circuit (PLC) technique, the electronic circuit, the plurality of optical transmitter-receivers, the plurality of optical switches, the wiring, and the optical waveguides are formed on an upper surface of one and the same substrate, the wiring and the optical waveguides compose an interposer with optical waveguides, and the electronic circuit, the plurality of optical transmitter-receivers, and the plurality of optical switches are arranged, in the formed state, on one and the same plane of an upper surface of the interposer with optical waveguides.

11. The photonics-electronics convergence switch according to claim 5, wherein each of the optical switches is a waveguide optical switch fabricated using a planar lightwave circuit (PLC) technique, the electronic circuit, the plurality of optical transmitter-receivers, the plurality of optical switches, the wiring, and the optical waveguides are formed on an upper surface of one and the same substrate, the wiring and the optical waveguides compose an interposer with optical waveguides, and the electronic circuit, the plurality of optical transmitter-receivers, and the plurality of optical switches are arranged, in the formed state, on one and the same plane of an upper surface of the interposer with optical waveguides.

* * * * *